(12) United States Patent
Yamashirodani et al.

(10) Patent No.: US 8,934,129 B2
(45) Date of Patent: Jan. 13, 2015

(54) IMAGE FORMING APPARATUS AND IMAGE FORMING METHOD ERASING PRINT DATA IN DESCENDING OR ASCENDING ORDER OF FILE SIZE DEPENDENT UPON FREE MEMORY SPACE AVAILABLE

(71) Applicant: KYOCERA Document Solutions Inc., Osaka (JP)

(72) Inventors: Masayuki Yamashirodani, Osaka (JP); Hideki Tennichi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/066,283

(22) Filed: Oct. 29, 2013

(65) Prior Publication Data

US 2014/0118788 A1    May 1, 2014

(30) Foreign Application Priority Data

Oct. 31, 2012  (JP) ................ 2012-240950

(51) Int. Cl.
| | | |
|---|---|---|
| *G06K 15/00* | (2006.01) | |
| *G06K 15/02* | (2006.01) | |
| *G06F 3/06* | (2006.01) | |
| *H04N 1/00* | (2006.01) | |
| *H04N 1/32* | (2006.01) | |

(52) U.S. Cl.
CPC ............ *G06K 15/02* (2013.01); *G06K 15/1886* (2013.01); *G06F 3/06* (2013.01); *H04N 1/00* (2013.01); *H04N 1/00954* (2013.01); *H04N 1/32448* (2013.01); *H04N 1/32454* (2013.01); *H04N 2201/3295* (2013.01); *H04N 2201/3298* (2013.01); *H04N 2201/3297* (2013.01); *H04N 2201/214* (2013.01); *H04N 2201/218* (2013.01)
USPC ....................................................... 358/1.16

(58) Field of Classification Search
CPC .................................................... G06F 3/0652
USPC ............................................... 358/1.14, 1.16
See application file for complete search history.

(56) References Cited

U.S. PATENT DOCUMENTS 7,812,973 B2 * 10/2010 Miyata .................... 358/1.11

FOREIGN PATENT DOCUMENTS

| JP | 10-190997 A | 7/1998 |
| JP | 2002-033894 A | 1/2002 |
| WO | WO 00/13077 | * 6/2000 |

* cited by examiner

*Primary Examiner* — Eric A Rust
(74) *Attorney, Agent, or Firm* — Studebaker & Brackett PC (57) ABSTRACT

An image forming apparatus includes a storage part storing a plurality of job data, an output part outputting a job of the job data and a job data erasion controlling part configured to overwrite and delete a previously output job data output from the output part. The job data erasion controlling part overwrites and deletes the previously output job data in an idle time other than a time at which the storage part is read and/or written when the job is output, and then, if the storage part has a free space area having a capacity larger than a predetermined capacity, the output job data is overwritten and deleted in descending order of data size, and if the storage part has a free space area having a capacity smaller than the predetermined capacity, the output job data is overwritten and deleted in ascending order of data size.

6 Claims, 9 Drawing Sheets

IMAGE FORMING APPARATUS AND IMAGE FORMING METHOD ERASING PRINT DATA IN DESCENDING OR ASCENDING ORDER OF FILE SIZE DEPENDENT UPON FREE MEMORY SPACE AVAILABLE

INCORPORATION BY REFERENCE

This application is based on and claims the benefit of priority from Japanese Patent application No. 2012-240950 filed on Oct. 31, 2012, the entire contents of which are incorporated herein by reference.

BACKGROUND

The present disclosure relates to an image forming apparatus and an image forming method, particularly to an image forming apparatus and an image forming method configured to erase job data in a storage part by overwriting.

There exists an image forming apparatus, such as a multi-function peripheral (MFP), capable of executing a job such as a print job and a scan job.

Such an image forming apparatus executes a plurality of jobs transmitted from multiple users by using multi-process, such as time sharing processing, and multithread.

The image forming apparatus, in view of security, executes such operation that data of a previously output job (hereinafter, often called as job data) containing image data or the like stored in a storage part, such as a HDD (Hard Disk Drive), is erased by writing a value of "0" or random digits on the data.

Here, referring to FIG. 9, an example of an operation to erase job data will be described.

Since it takes a long period to erase job data, an image forming apparatus executes such operation that the erasing of the job data is suspended at which time a job execution is started and the erasing of the job data is resumed at which time the job execution is completed.

Therefore, since it is impossible to erase the job data during the executing of the job, it takes a long period to erase unnecessary data.

For example, in the image forming apparatus, when image data stored in a memory is automatically erased, the erasing operation of image data having a high frequency of output among the written image data is delayed and image data having a low frequency of output is erased preferentially. This facilitates the highly important data to be remained in the memory constantly and thus enables to realize an effective data management.

For example, in an image input and output device applied to an image forming apparatus, an information of degree of importance is added to image data. When a record of image data input newly cannot be stored owing to insufficient capacity of the storage, the previously stored image data is erased based on the information of the degree of importance, thereby preventing interrupting the job owing to the insufficient capacity of the storage.

For example, an image data management device applied to an image forming apparatus sequentially stores and also sequentially reads image data in and from a hard disk in a storage part, and detects the hard disk working condition during the reading. And, based on the detected result, the image data management device controls so as to erase at least a part of the previously read data from the hard disk. This enables to execute the job, even if an input job has a large data size, while maintaining the storage condition of the job containing the previously stored image data.

However, the technique of the above-mentioned image forming apparatus is correspondent to an operation to erase an "index" of a file system in the storage part. That is, the technique cannot be applied to an operation requiring a long period such as an operation to erase unnecessary job data output previously by overwriting.

For example, an image controlling device applied to an image forming apparatus, when a predetermined area among divided areas of a storage part is controlled prior to an usual image controlling preferentially, interrupts an erasing operation and executes a control operation to erase the information data itself for the predetermined area by the erasing part from the beginning at which time the usual image controlling is completed.

Figure 9:
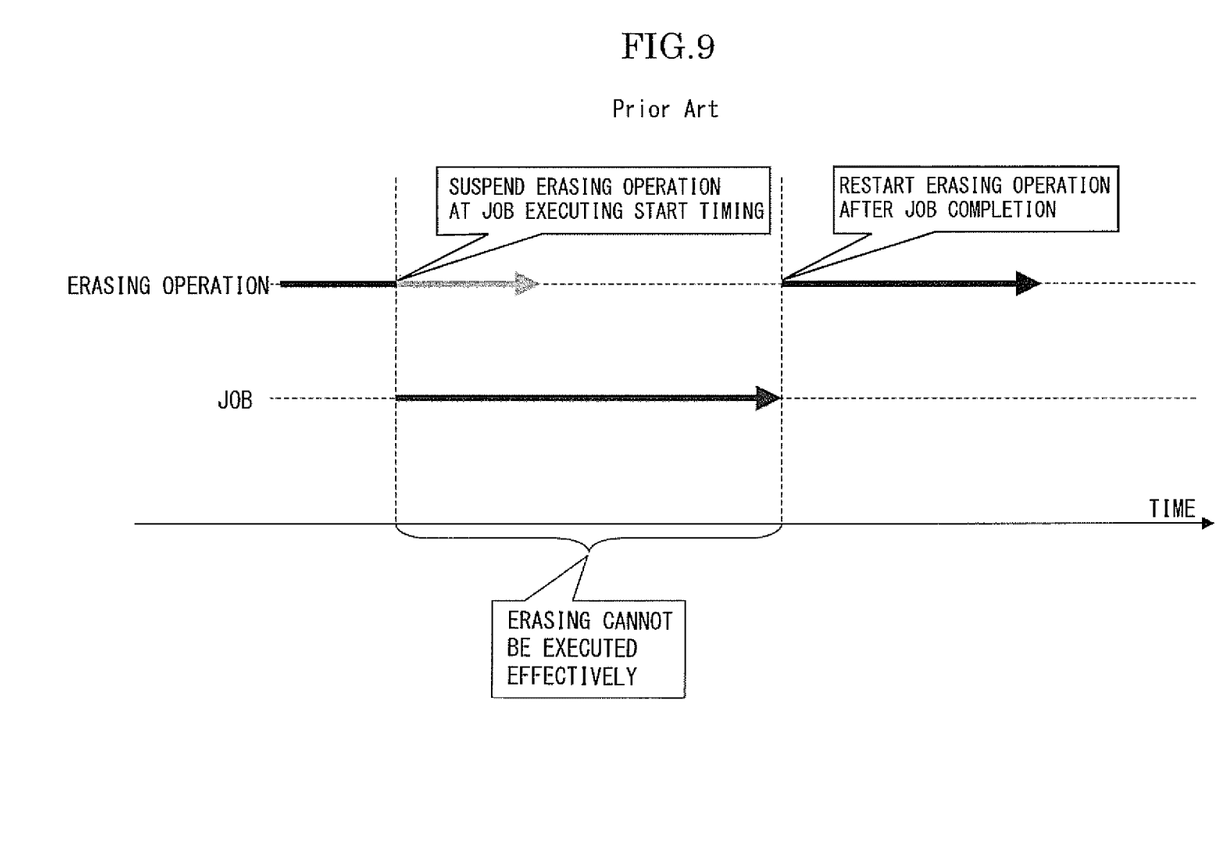
FIG. 9 is an illustrative diagram schematically showing an operation to erase job data in the image forming apparatus.

The image controlling apparatus executes the same operation as the operation shown in FIG. 9.

However, in the image forming apparatus executing the above-mentioned erasing operation, although the erasing operation in an area of the storage part is executed according to the erasing pattern and the priority, because the erasing operation is suspended during the execution of the job, the job data cannot be erased effectively.

SUMMARY

In accordance with an embodiment of the present disclosure, an image forming apparatus includes a storage part, an output part and a job data erasion controlling part. The storage part stores a plurality of job data. The output part outputs a job of the job data. The job data erasion controlling part erases the job data output from the output part previously, by overwriting. The job data erasion controlling part erases the previously output job data by overwriting within an idle time other than a time at which the storage part is read and/or written when the job is output. Here, if the storage part has a free space area having a capacity larger than a predetermined capacity, the output job data is erased by overwriting in descending order of data size, and if the storage part has the free space area having a capacity smaller than the predetermined capacity, the output job data is erased by overwriting in ascending order of data size.

In accordance with an embodiment of the present disclosure, an image forming method includes a storage step, an output step and a job data erasion step. In the storage step, a plurality of job data are stored in a storage part. In the output step, the plurality of job data are output. In the job data erasion controlling step, the job data previously output at the output step are erased by overwriting. The job data erasion controlling step has an erasing step configured to erase the previously output job data by overwriting within an idle time at which the storage part is read and/or written when the job is output, an easing step configured to erase the output job data by overwriting in descending order of data size if the storage part has a free space area having a capacity larger than a predetermined capacity and another erasing step configured to erase the output job data by overwriting in ascending order of data size if the storage part has the free space area having a capacity smaller than the predetermined capacity.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

In the following, with reference to FIG. 1 to FIG. 2, the configuration of the image forming apparatus 1 of the embodiment according to the present disclosure will be described in detail.

Figure 1:
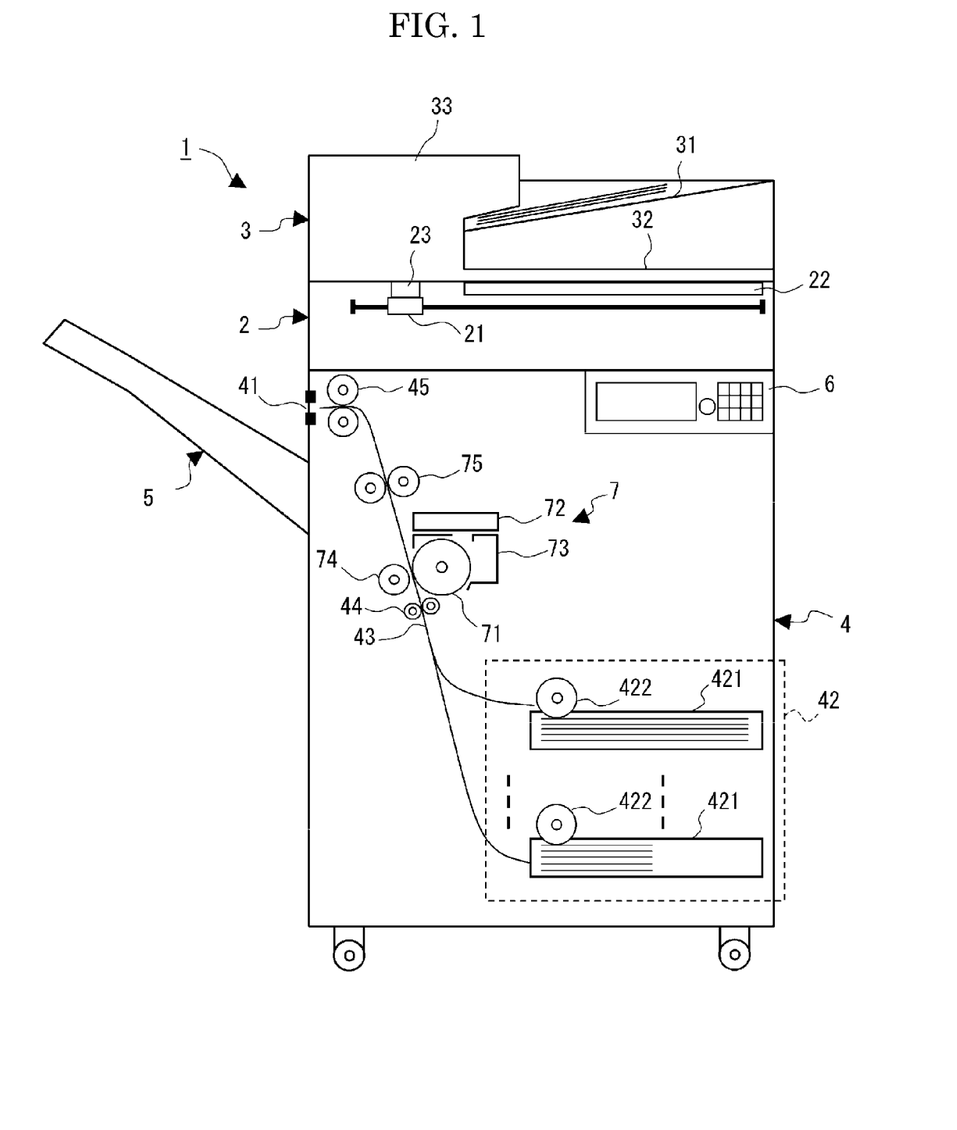
FIG. 1 is a sectional view schematically showing an internal configuration of an image forming apparatus according to an embodiment of the present disclosure.

As shown in FIG. 1, the image forming apparatus 1 of the embodiment includes a document reading part 2, a document feeding part 3, a main body part 4, a stack tray 5 and an operation panel part 6.

The document reading part 2 is arranged at the upper portion of the main body part 4 and the document feeding part 3 is arranged at the upper portion of the document reading part 2. The stack tray 5 is arranged on the side of a recording sheet ejecting port 41 provided at the main body part 4. The operation panel part 6 is arranged on the front side of the image forming apparatus 1.

The document reading part 2 includes a scanner 21, a platen glass 22 and a document reading slit 23. The scanner 21 has an exposure lamp and an image sensor, such as CCD (Charge Coupled Device) and CMOS (Complementary Metal Oxide Semiconductor), and is configured so as to be able to move in the sub-scanning direction (in the left and right directions in FIG. 1). The platen glass 22 is a document table made of a transparent member, such as a glass. The document reading slit 23 has a slit formed in a direction perpendicular to the feeding direction of the document in the document feeding part 3.

When the document placed on the platen glass 22 is read, the scanner 21 is moved to a position facing the platen glass 22 and reads the document while scanning the document placed on the platen glass 22 to acquire image data, and then, outputs the acquired image data to the main body part 4.

When the document fed by the document feeding part 3 is read, the scanner 21 is moved to a position facing the document reading slit 23 and reads the document through the document reading slit 23 while synchronizing with the document feeding operation of the document feeding part 3 to acquire image data, and then, outputs the acquired image data to the main body part 4.

The document feeding part 3 includes a document placing part 31, a document ejecting part 32 and a document conveying mechanism 33. The document placed on the document placing part 31 is conveyed to a position facing the document reading slit 23 one by one in sequence by the document conveying mechanism 33 and then ejected to the document ejecting part 32. The document feeding part 3 is configured to be folded so that an upper surface of the platen glass 22 can be opened by lifting the document feeding part 3 upward.

The main body part 4 includes an image forming part 7 and also a recording sheet feeding part 42, a recording sheet conveying path 43, conveying rollers 44 and ejecting rollers 45. The recording sheet feeding part 42 has a plurality of recording sheet feeding cassettes 421 which store recording sheets having different sizes and different orientations and recording sheet feeding rollers 422 configured to pick up the recording sheet one by one from the respective recording sheet feeding cassettes 421 to the recording sheet conveying path 43.

The recording sheet feeding rollers 422, the conveying rollers 44 and the ejecting rollers 45 function as a conveying part. The recording sheet is conveyed by the conveying part. The recording sheet supplied to the recording sheet conveying path 43 by the feeding roller 422 is conveyed to the image forming part 7 by the conveying rollers 44.

Then, the recording sheet on which a record is applied by the image forming part 7 is ejected on the stack tray 5 by the ejecting rollers 45.

The operation panel part 6 includes a display member, such as a LCD (Liquid Crystal Display), a start key, numeric keys, buttons and touch panels for switching an operation mode into a copy mode, a facsimile mode and a scanner mode and providing directions related to printing, sending and receiving of the selected document. That is, the operation panel part 6 detects a direction of a user for the image forming apparatus 1.

The numeric keys of the operation panel part 6 receive authentication information, such as a password, and directing information to direct various operation.

The image forming part 7 includes a photosensitive drum 71, an exposing part 72, a developing part 73, a transferring part 74 and a fixing part 75.

The exposing part 72 is an optical unit having a laser devise, a LED array, mirrors, lenses and others and irradiates the photosensitive drum 71 with a light or the like according to the image data to expose the photosensitive drum 71 and to form an electrostatic latent image on the surface of the photosensitive drum 71.

The developing part 73 is a developing unit to develop the electrostatic latent image formed on the photosensitive drum 71 and to form a toner image based on the electrostatic latent image on the photosensitive drum 71.

The transferring part 74 transfers the toner image formed on the photosensitive drum 71 at the developing part 73 on a recording sheet.

The fixing part 75 heats the recording sheet on which the toner image is transferred to fix the toner image on the recording sheet.

Figure 2:
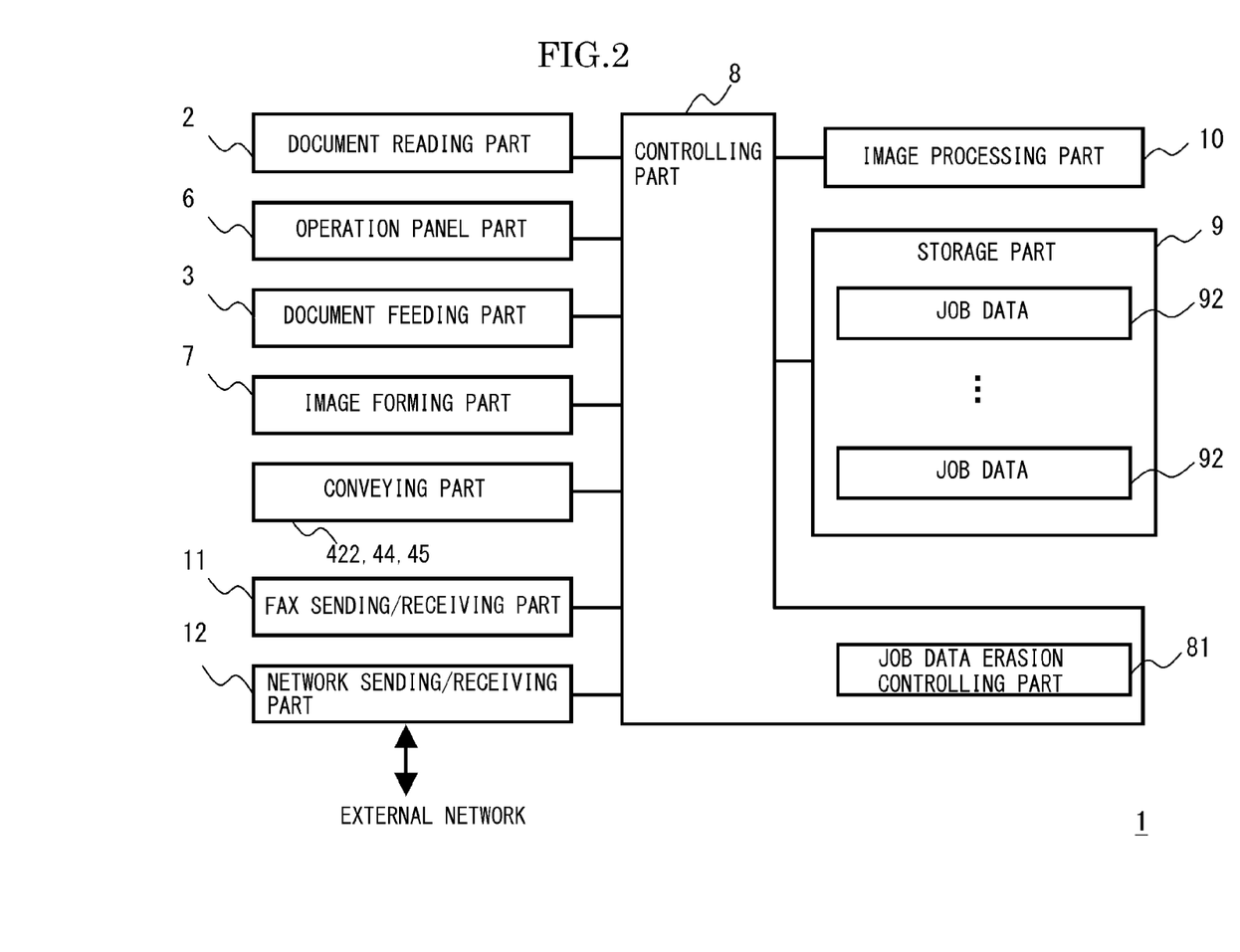
FIG. 2 is a schematic block diagram schematically showing a control configuration of the image forming apparatus according to the embodiment of the present disclosure.

FIG. 2 is a block diagram schematically showing a control configuration of the image forming apparatus 1. The above-mentioned image reading part 2, the document feeding part 3, the conveying part (the feeding rollers 422, the conveying rollers 44 and the ejecting rollers 45), the operation panel part 6 and the image forming part 7 are connected to a controlling part 8 and operatively controlled by the controlling part 8 (a job output controlling part). The controlling part 8 is connected to a storage part 9, an image processing part 10, a facsimile sending/receiving part 11 and a network sending/receiving part 12 and others.

The controlling part 8 is an information processing device, such as a microcomputer, having ROM (Read Only Memory) and RAM (Random Access Memory) and others. The ROM stores a control program to execute an operational control of the image forming apparatus 1.

The controlling part 8 reads the control program stored in the ROM, develops the control program in the RAM and controls the entire of the image forming apparatus according to directing information and others input from the operation panel part 6 or on the basis of a direction from a terminal (not shown) via the network sending/receiving part 12. Then, the controlling part 8 and the image processing part 10 output job data 92 stored in the storage part 9 by each component.

The controlling part 8 has a job data erasion controlling part 81 as a functional composition element.

The job data erasion controlling part 81 calculates information, such as a capacity and a position in the storage part 9, of the job data 92 stored in the storage part 9, an executing period of the job data 92 and a period to erase the previously output unnecessary job data 92, and then executes an operation to erase the unnecessary job data 92.

The job data erasion controlling part 81 may run independently of a job executing by another part of the controlling part 8 and erase the unnecessary job data 92 in the storage part 9 in parallel by multi-process, multithread or the like. In such a case, the job data erasion controlling part 81 employs an idle time (waiting time) other than a time required for reading/writing of the storage part 9 regarding to the executing job, and erases the unnecessary job data 92. This can erase the unnecessary job data 92 while preventing delay of an access time to the storage part 9 owing to occupation of a bus and a signal line by access to the storage part 9 and also occurrence of deadlock.

The job erasing operation executed by the job data erasion controlling part 81 will be described in detail later.

The storage part 9 is a storage tool, such as a semiconductor memory and a HDD (Hard Disk Drive), which stores the plurality of job data 92.

The job data 92 contains data regarding various jobs to execute various functions of each components of the image forming apparatus 1.

The job data 92 includes various types of data, such as a type of the job, a command to execute a function, a job ID (Identification), an executing priority of the job, an executing period, an erasion waiting flag, image data/printing data, page description language data, a size (capacity) of the job data 92 itself and a position on a file system of the storage part 9.

The type of the job includes, for example, a printing job, a scanning job, a copying job and a facsimile job and others. That is, as the job data 92, data for printing send from a terminal or the like connected to an external network, data scanned by the document reading part 2, printing data image-processed by the image processing part 10 and data for sending/receiving by the facsimile or the like are employed. When the job data 92 is acquired/created, the controlling part 8 adds a job ID (Identification) having a predetermined unit to the job data 92. The job ID is stored in the storage part 9 with a user ID to execute each job. The "erasion waiting flag" of the job data 92 is information indicating a condition in which the data is previously output from each component and others and is waiting for erasing. Here, when the job data 92 is not output actually due to an erasion command, such as a job cancel, the "erasion waiting flag" is set and the same operation as the "previously output" job data 92 is executed.

The storage part 9 stores a save folder of each user. The save folder can store image data which is read by the document reading part 2 and then is image-processed by the image processing part 10 and image data read from a recording medium or the like, like NAS (Network Attached Storage).

The image processing part 10 is a control operation component, such as a DSP (Digital Signal Processer) and a GPU (Graphic Processing Unit), in the image forming apparatus 1. The image processing part 10 is a tool to carry out predetermined image processes for image data, for example, to carry out various image processes, such as image improvement process containing enlarging/reducing, density adjustment and tone reproduction, and others.

The image processing part 10 may convert an image read by the document reading part 2 to image data formatted by PDF (Portable Document Format), TIFF (Tagged Image File Format) or the like.

The facsimile sending/receiving part 11 is a component to send and receive facsimile data in the image forming apparatus 1 and connected to a normal telephone line, an ISDN (Integrated Services Digital Network) line or the like.

The facsimile sending/receiving part 11 stores received facsimile image in the storage part 9. The facsimile sending/receiving part 11 may send image data stored in the storage part 9 by using a facsimile, instead of recording in the image forming part 7.

The network sending/receiving part 12 is a network connection component, such as a LAN (Local Area Network) board, a radio transceiver, a telephone dialer and a coupler, to connect a network in the image forming apparatus 1.

The network sending/receiving part 12 is connected to an external network, not shown, and sends/receives job data 92 to/from various terminals such as a plurality of PCs (Personal Computers), mobile phones and smart phones.

In the image forming apparatus 1, the controlling part 8, the image processing part 10 and others may be formed in a body as a CPU (Central Processing Unit) containing a GPU and a chip-on module package.

The image forming apparatus 1 may have an upload part to upload on an external server (not shown), a memory card reader to read a recording medium and others.

The image forming apparatus 1 may have an IC (Integrated Circuit) card reader, a biometric authentication unit to authenticate a system manager and a device manager or the like, in addition to the operation panel part 6.

Referring to FIG. 3 to FIG. 8, a job data erasing operation to erase the unnecessary job data 92 by using the image forming apparatus 1 according to the embodiment of the present disclosure will be described.

In the image forming apparatus 1, unlike a normal storage such as a PC, for increased security, it is necessary to completely erase the job data 92, which has been stored in the storage part 9 of limited capacity and is shown by the "erasion waiting flag" indicating that the output of the data has been completed already. Therefore, in this embodiment, it is necessary not only to erase the index of the file of the previously output job data 92 but also to "erase by overwriting" the data area occupied with the file of the storage part 9 actually and to erase the job data 92. That is, the erasing operation of the job data 92 needs a long period as a size of the occupied area in the file system of the storage part 9 becomes large.

Here, the controlling part 8 including the job data erasion controlling part 81 executes the job and an erasing operation of the job data 92 in parallel and simultaneously by using a plurality of processes and threads. In such a case, in this embodiment, since the controlling part 8 has been waiting an operation from another component, it is possible to erase the previously output job data 92 during an idle time at which the storage part 9 is not accessed for reading/writing. However, if the predetermined area of the file system will not be erased, it is impossible to store another job data 92 responding to the completion of the erasing operation. Thus, it is necessary to select one of the job data 92 to be erased at a time.

Accordingly, the job erasing operation according to this embodiment selects and erases the most efficiently erasable job data 92 while preventing fragmentation of the file system of the storage part 9 as much as possible.

Figure 3:
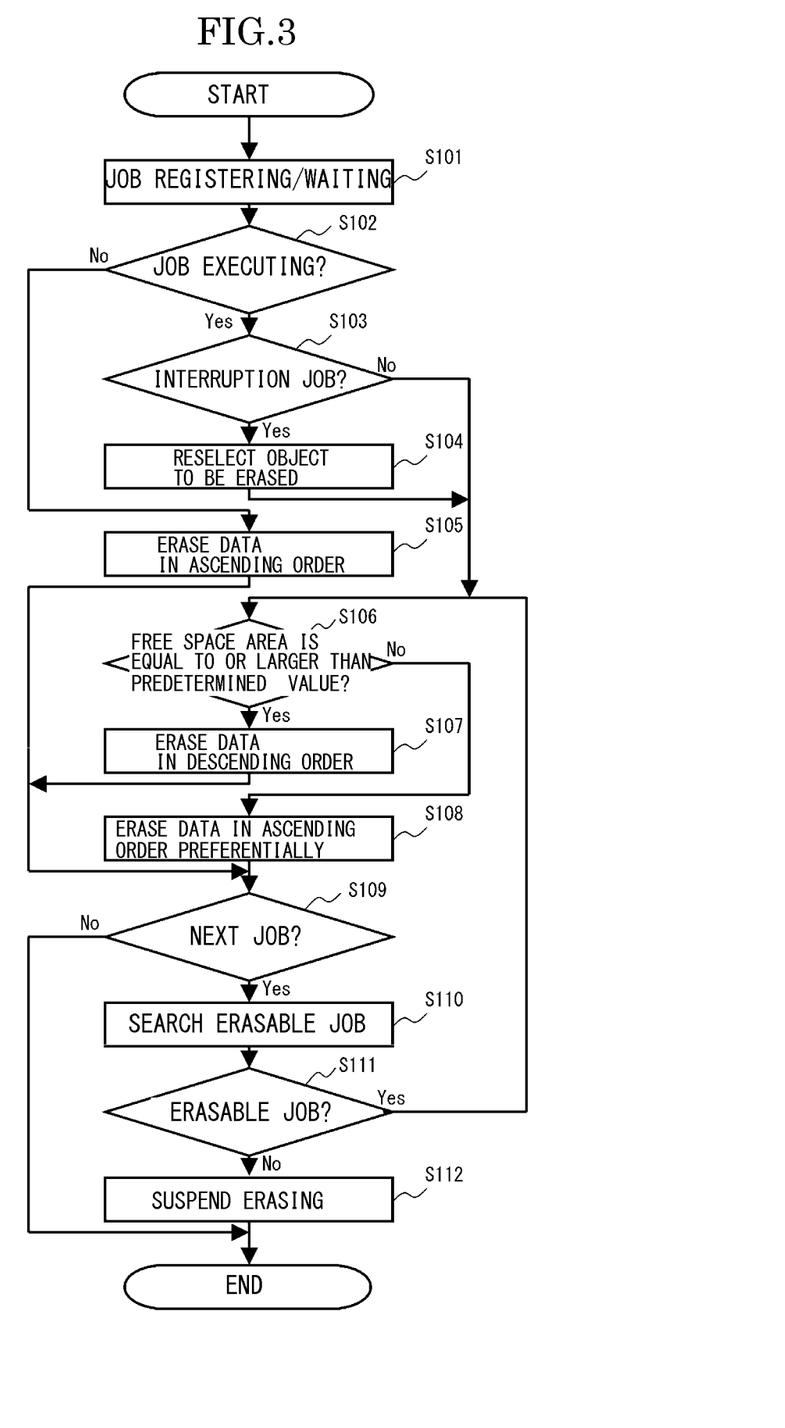
FIG. 3 is a flowchart illustrating a job erasing operation of the image forming apparatus according to the embodiment in the present disclosure.

Hereinafter, referring to the flowchart shown in FIG. 3, each step of the job erasing operation will be described in detail. In the job erasing operation, mainly the job data erasion controlling part 81 of the controlling part 8 executes the program stored in the storage part 9 by using hardware resources. In such a case, the job data erasion controlling part 81 executes the job erasing operation at predetermined intervals by using a real time timer.

Firstly, the job data erasion controlling part 81 executes a job registering/waiting operation (step S101).

Specifically, the job data 92 directing to execute various jobs is stored in the storage part 9 by instruction of the user from the operation panel part 6, instruction received at the facsimile sending/receiving part 11 or received from an external terminal at the network sending/receiving part 12 or the like.

The job data erasion controlling part 81 detects that the job data 92 is stored and an output of the job data 92 is registered regardless of whether or not the unnecessary job data 92 is being erased.

The job data erasion controlling part 81 proceeds to next step S102 when the job data 92 is registered or when a predetermined period is elapsed without registration of the job data 92.

Next, the job data erasion controlling part 81 decides whether or not the executing job exists (step S102). When the job data 92 is stored in the storage part 9 and is being executed (S102: Yes), the job data erasion controlling part 81 proceeds to step S103. In other cases (step S102: No), that is, a case in which the job data 92 is not stored in the storage part 9 or a case in which a timer does not direct an execution of the operation yet, the job data erasion controlling part 81 proceeds to step S105.

When the job data 92 registered at the above-mentioned job registering operation exists, the job data erasion controlling part 81 decides whether or not the registered job is a "interruption" job (step S103). That is, when unexpected job data 92 is registered, the job data erasion controlling part 81 refers to a priority of the job data 92. And, when the registered job data 92 has a higher priority than that of the executing job data 92, the job data erasion controlling part 81 decides that the registered job data is a "interruption" job which has to be executed immediately (step S103: Yes) and proceeds to step S104. In other cases (step S103: No), since the registered job is a "waiting" job to be executed after the completion of the executing job, the job data erasion controlling part 81 decides that the registered job data 92 is not the "interruption" job (step S103: No) and proceeds to step S106.

When the registered job data 92 is the interruption job, the job data erasion controlling part 81 executes an operation to reselect an object to be erased by overwriting (step S104).

Figure 4:
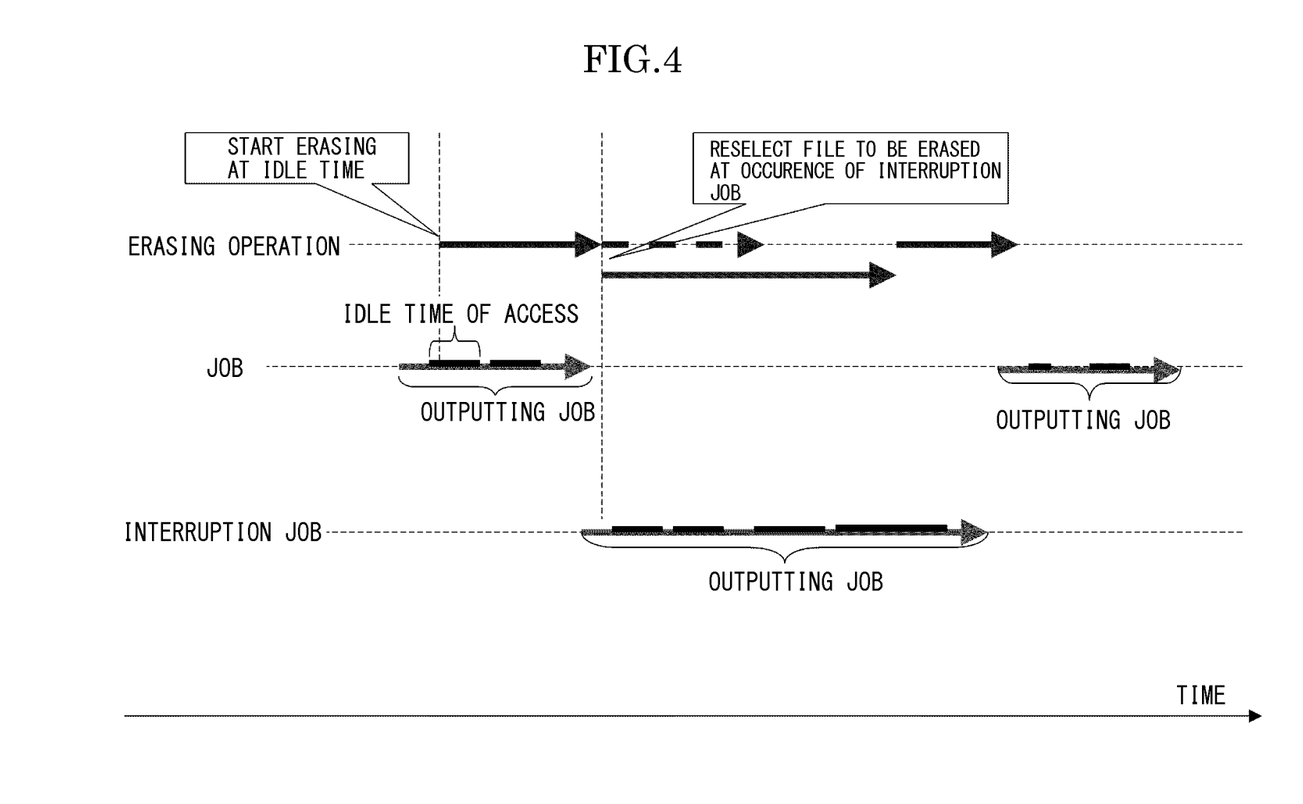
FIG. 4 is an illustrative diagram schematically showing an operation to reselect an object to be erased by overwriting in the image forming apparatus according to the embodiment of the present disclosure.

An operation to reselect an object to be erased by overwriting will be described referring to FIG. 4. The job data erasion controlling part 81 employs an idle time of the job execution time of the controlling part 8 to erase the previously output job data 92 by overwriting, as described later. Under this situation, when the job data 92 which is the interruption job is registered, the job data erasion controlling part 81 decides that the interruption job occurs and then suspends the erasing operation of the job data 92 to cancel the selection of the job data 92 as an object to be erased by overwriting.

Then, the job data erasion controlling part 81 proceeds to step S106. The job data erasion controlling part 81 reselects the job data 92 to be erased by overwriting, as described later.

When an executing job does not exist, the job data erasion controlling part 81 executes an operation to erase by overwriting in ascending order of data size (step S105).

Figure 5:
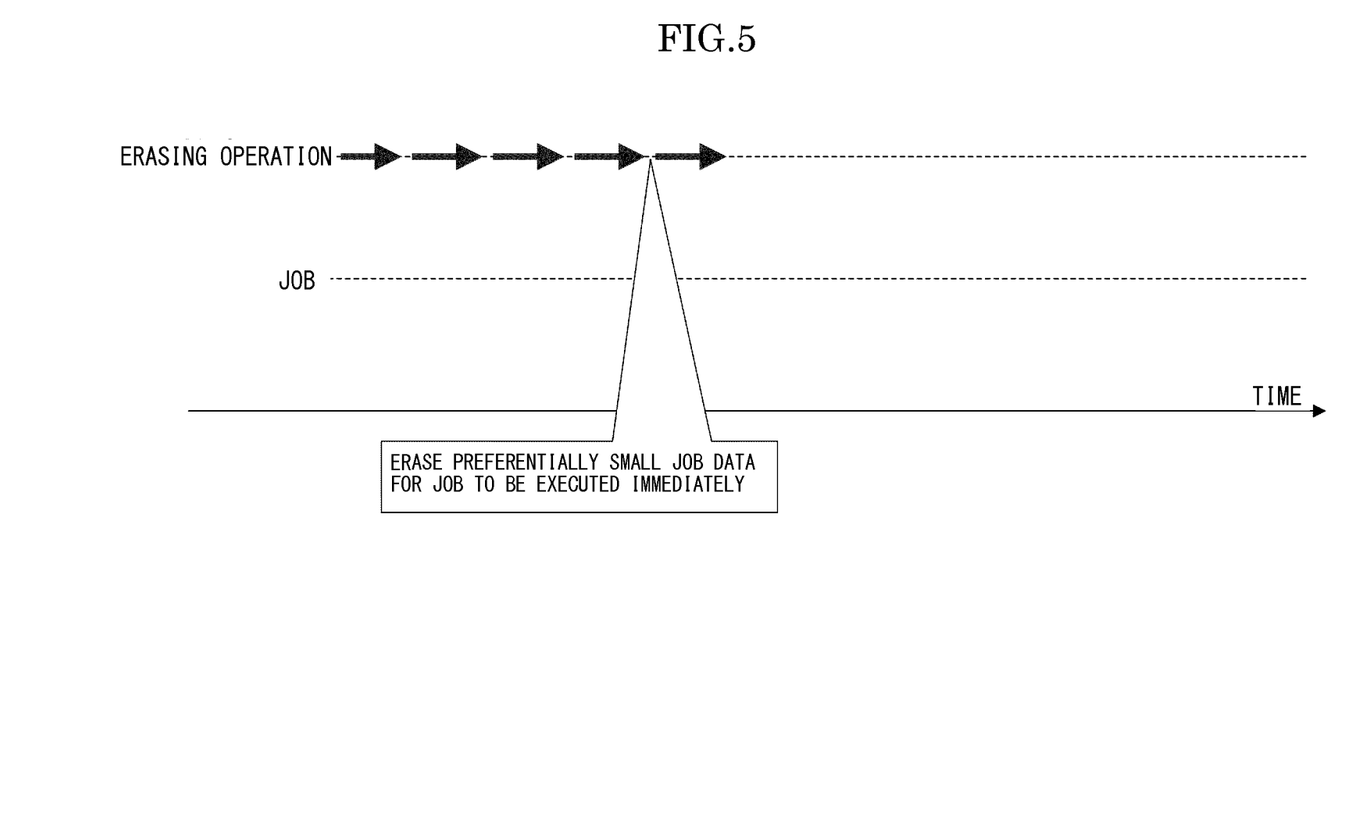
FIG. 5 is an illustrative diagram schematically showing an operation to erase data by overwriting in ascending order of data size in the image forming apparatus according to the embodiment of the present disclosure.

The operation to erasing by overwriting in ascending order of data size will be described referring to FIG. 5. The job data erasion controlling part 81 searches the previously output job data 92 from the storage part 9 by referring to the "erasion waiting flag", and erases the data by overwriting preferentially in the order in which a size of the data is ascended.

The job data erasion controlling part 81 usually erases by the area unit of the storage part 9 regarding the previously output job data 92. Here, the job data erasion controlling part 81 cannot erase another previously output job data 92 if the erasing operation by the area unit will not be completed. Therefore, the job data erasion controlling part 81 erases the job data 92 in ascending order of data size and thus the erasing operation of the job data 92 can be completed and ready to the erasing operation of another job data 92 if the job data 92 is registered suddenly or when the job activated by a timer exists.

The job data erasion controlling part 81 proceeds to step S109 when a predetermine number of previously output job data 92 are erased or when a previously output job data 92 does not exist.

When the job is being executing and the job data 92 is not the "interruption" job, the job data erasion controlling part 81 decides whether or not a size of a free space area of the storage part 9 is equal to or larger than a predetermined value (step S106). For the predetermined value for deciding the size of the free space area, based on a value of 70 to 90% of the capacity of the storage area of the storage part 9, a standard size of the job data 92 containing the predetermined number of image data, an average of size of the job data 92 of the image forming apparatus 1 or the like, a size of the area of the storage part 9 capable of storing 2 to 10 or more of the job data 92 or the like is employed.

The job data erasion controlling part 81 proceeds to step S107 when a capacity of the free space area of the storage part 9 is equal to or larger than the predetermined value (step S106: Yes). In other cases (step S106: No), the job data erasion controlling part 81 proceeds to step S108.

When the job is being executed and the size of the free space area of the storage part 9 is equal to or larger than the predetermined value, the job data erasion controlling part 81 executes an erasing operation in descending order of data size (step S107).

Figure 6:
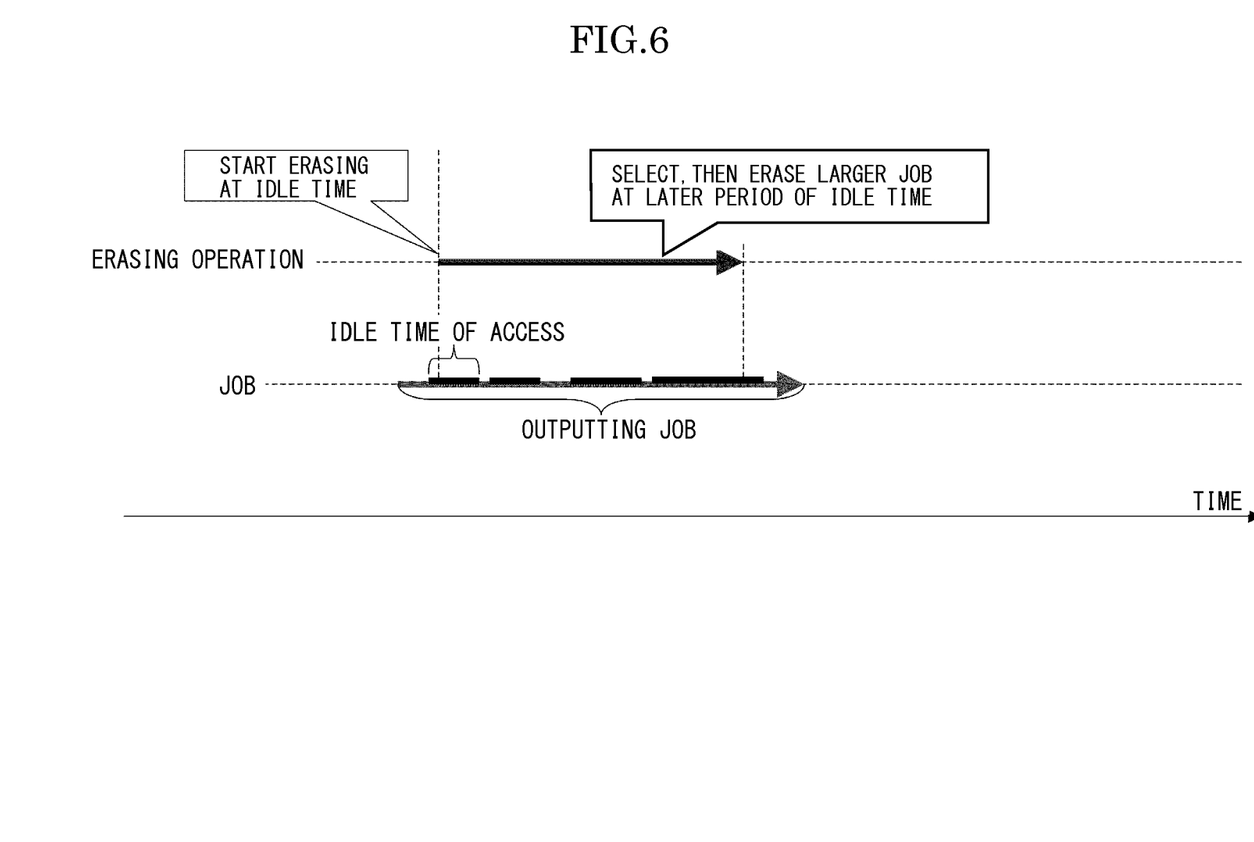
FIG. 6 is an illustrative diagram schematically showing an operation to erase data by overwriting in descending order of data size in the image forming apparatus according to the embodiment of the present disclosure.

The erasing operation in descending order of data size will be described referring to FIG. 6. The job data erasion controlling part 81 refers to the storage part 9 to search previously output unnecessary large job data 92 which has an area size equal to or larger than the predetermined value and is proposed to be erased. The job data erasion controlling part 81 searches previously output unnecessary job data 92 having the area size equal to or larger than the predetermined value for every predetermined area units from the back side of the sector or the like of the file system, for example, from the periphery area of the HDD (Hard Disk Drive).

Then, the job data erasion controlling part 81 starts to erase the searched previously output job data 92, which is proposed to be erased, during an idle time of the access to the storage part 9. In such a case, the job data 92 is erased by overwriting preferentially in descending order of data size.

Then, the job data erasion controlling part 81 proceeds to step S109.

When the job is being executed and the size of the free space area of the storage part 9 is less than the predetermined value, the job data erasion controlling part 81 executes an erasing operation in ascending order of data size (step S108).

Figure 7:
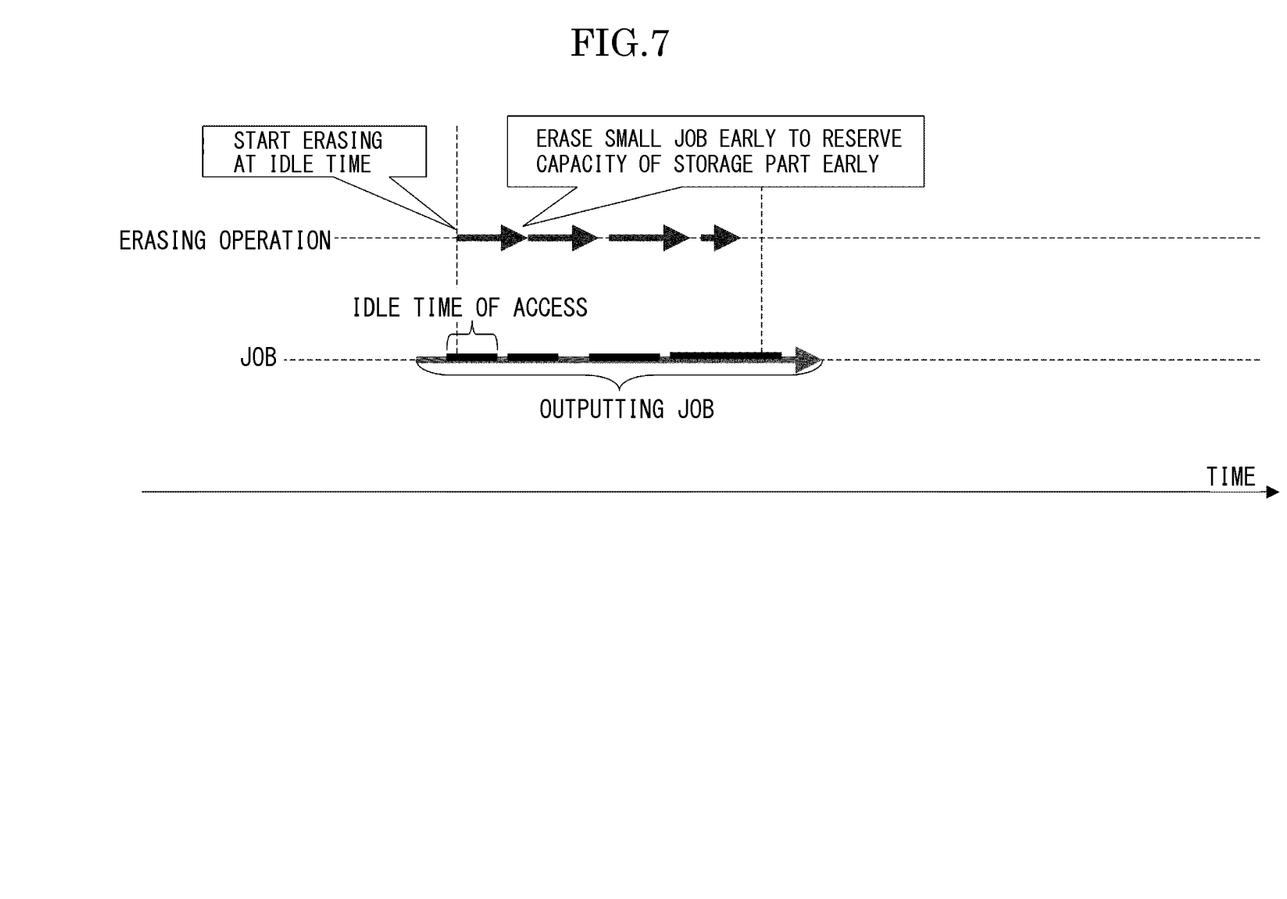
FIG. 7 is an illustrative diagram schematically showing an operation to erase in ascending order of data size in the image forming apparatus according to the embodiment of the present disclosure.

The erasing operation in ascending order of data size will be described referring to FIG. 7. The job data erasion controlling part 81 refers to the storage part 9 to search previously output unnecessary job data 92. In such a case, the job data erasion controlling part 81 searches previously output unnecessary small job data 92 having an area size equal to or smaller than the predetermined value preferentially in order to erase for every area units quickly and to be able to store new job data. In such a case, the job data erasion controlling part 81 searches so as to be able to reserve consecutive areas, such as sector of the file system. However, if there is no job data 92 having the area size equal to or smaller than the predetermined value in the consecutive areas, the previously output job data 92 is proposed to be erased.

The job data erasion controlling part 81, therefore, erases the small and consecutive job data 92 proposed to be erased preferentially.

The job data erasion controlling part 81 proceeds to step S109 before the completion of the executing job or before the predetermined time at which the executing job is completed. In addition, the job data erasion controlling part 81 proceeds to step S109 also when there is no previously output job data 92 already.

When the predetermined number of the previously output job data 92 are erased or the job would be completed soon, the job data erasion controlling part 81 decides whether or not there is the next job (step S109). The job data erasion controlling part 81 proceeds to step S110 when there is the job data 92 of the job to be executed next (step S109: Yes). In other cases (step S109: No), the job data erasion controlling part 81 completes the job erasing operation and waits for a predetermined period or until the registration of the job data 92.

At step S110, the job data erasion controlling part 81 executes an operation to search an erasable job.

In the operation to search an erasable job, the job data erasion controlling part 81 searches the storage part 9 to know whether or not the previously output job data 92 is stored in the storage part 9.

In such a case, the job data erasion controlling part 81 estimates a period necessary for erasing each of the searched job data 92 based on the size of the data or the like.

Next, the job data erasion controlling part 81 decides from the searched erasable job data 92 whether or not there is an erasable job data 92 before the executing of the next job (step S111). When such a job data 92 exists (step S111: Yes), the job data erasion controlling part 81 proceeds to step S112. In other cases (step S111: No), the job data erasion controlling part 81 returns to step S106 and then erases the previously output job data 92 according to the free space condition of the storage part 9. In such a case, by employing the searched result at step S110, a configuration for shortening the searching period may be executed.

When there is no erasable job data 92 before the executing of the next job, the job data erasion controlling part 81 executes an operation to suspend the erasing (step S112).

Figure 8:
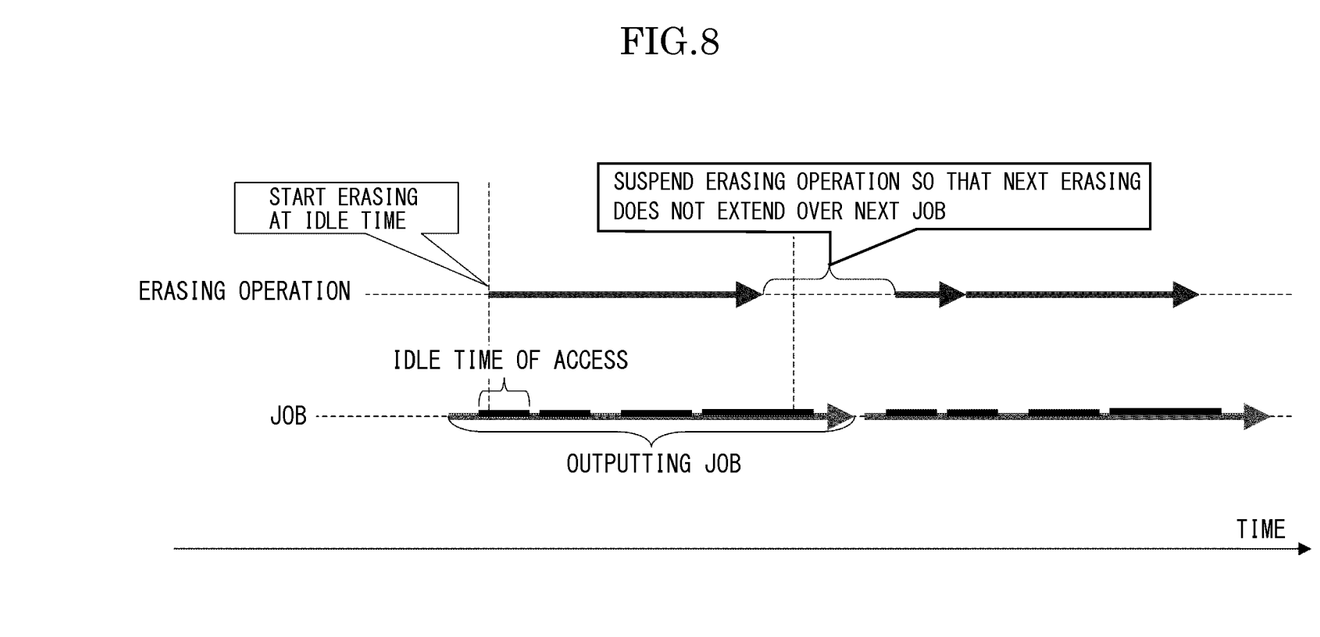
FIG. 8 is an illustrative diagram schematically showing an operation to suspend erasing in the image forming apparatus according to the embodiment of the present disclosure.

The operation to suspend the erasing will be described referring to FIG. 8. When the executing job should be completed soon and there is no previously output job data 92 erasable during an idle time of the controlling part 8, the job data erasion controlling part 81 suspends an operation regarding the erasing until executing the next job. That is, the erasing of the previously output job data 92 by overwriting is once suspended. Because, if the operation to erase the previously output data 92 by overwriting is started, when the operation extends over the job to be executed next, it is impossible to increase the free space area. When the job is newly registered and the execution is started, the controlling part 8 preferably suspends the erasing operation because an idle time of the controlling part 8 usually becomes less.

By suspending the operation regarding the erasing, the previously output job data 92 is erased during the idle time of the controlling part 8 when job data 92 is registered newly or a predetermined period is elapsed, and thus the free space area of the storage part 9 can be reserved surely.

From the above-mentioned operations, the job erasing operation is completed.

The above-mentioned constructions can provide the following effects.

The image forming apparatus 1 according to the embodiment does not suspend the erasing operation on the storage part 9 even if the job is being executed, and decides the operating condition of the controlling part 8 to erase the previously output job data 92 by overwriting.

Accordingly, the image forming apparatus 1 can execute erasing effectively and quickly erase the unnecessary job data 92, providing more improved security performance.

The image forming apparatus 1 allows reservation of the storage area of the storage part 9 as much as possible by employing the most of the idle time of the controlling part 8. That is, it is possible to erase the unnecessary job data 92 as much as possible during an idle time of the controlling part 8 and it is not necessary to suspend the executing the job and then erase the unnecessary job data 92, resulting in effective usage of the controlling part 8.

The image forming apparatus 1 can effectively erase the unnecessary job data 92 by changing the order in which the erasing operation is executed when the interruption job occurs.

The image forming apparatus 1 prevents that the job cannot be executed owing to less free space of the storage area of the storage part 9 caused by delay of the erasing of the unnecessary job data 92 as much as possible. This allows small capacity of the storage part 9 to reduce the cost of the image forming apparatus 1.

Such a primary resetting procedure by the image forming apparatus 1 can be applied for information processing apparatuses in addition to the image forming apparatus.

In addition, the image forming apparatus 1 may be a server connected to a printer via USB (Universal Serial Bus).

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. An image forming apparatus comprising:
a storage part configured to store a plurality of job data;
an output part configured to output a job of the job data; and
a job data erasion controlling part configured to erase the job data output from the output part previously, by overwriting, wherein the job data erasion controlling part erases the previously output job data by overwriting within an idle time other than a time at which the storage part is read and/or written when the job is output, and then, if the storage part has a free space area having a capacity larger than a predetermined capacity, the output job data is erased by overwriting in descending order of data size, and if the storage part has the free space area having a capacity smaller than the predetermined capacity, the output job data is erased by overwriting in ascending order of data size.

2. The image forming apparatus according to claim 1, wherein the job data erasion controlling part suspends an erasing operation until output of a next job when there is no output job data capable of being erased by overwriting before the completion of the output operation of the job.

3. The image forming apparatus according to claim 1, wherein the job data erasion controlling part reselects the job data to be erased by overwriting, when an interruption job which requires change of the job to be output occurs during the erasing operation.

4. An image forming method comprising:
a storage step configured to store a plurality of job data in a storage part;
an output step configured to output the plurality of job data; and
a job data erasion controlling step configured to erase the job data output at the output step previously, by overwriting,
wherein the job data erasion controlling step includes:
an erasing step configured to erase the previously output job data by overwriting within an idle time at which the storage part is read and/or written when the job is output;
an erasing step configured to erase the output job data by overwriting in descending order of data size if the storage part has a free space area having a capacity larger than a predetermined capacity; and
an erasing step configured to erase the output job data by overwriting in ascending order of data size if the storage part has the free space area having a capacity smaller than the predetermined capacity.

5. The image forming method according to claim 4, wherein the job data erasion controlling step suspends an erasing operation until output of the next job when there is no output job data capable of being erased by overwriting before the completion of the output operation of the job.

6. The image forming method according to claim 4, wherein the job data erasion controlling step reselects the job data to be erased by overwriting, when an interruption job which requires change of the job to be output occurs during the erasing operation.

* * * * *